United States Patent
Gehani et al.

(10) Patent No.: US 9,842,115 B2
(45) Date of Patent: Dec. 12, 2017

(54) MEDIA ASSET PROXIES

(71) Applicant: Apple Inc., Cupertino, CA (US)

(72) Inventors: Samir Gehani, Cupertino, CA (US);
Alexander B. Beaman, San Jose, CA (US); Kevin Calhoun, Santa Rosa, CA (US); John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 14/292,639

(22) Filed: May 30, 2014

(65) Prior Publication Data

US 2015/0347441 A1    Dec. 3, 2015

(51) Int. Cl.
    *G06F 17/30*    (2006.01)

(52) U.S. Cl.
    CPC .... *G06F 17/30153* (2013.01); *G06F 17/3002* (2013.01); *G06F 17/30424* (2013.01); *G06F 17/30843* (2013.01)

(58) Field of Classification Search
    None
    See application file for complete search history.

(56) References Cited

U.S. PATENT DOCUMENTS

| | | | |
|---|---|---|---|
| 7,660,902 B2 | 2/2010 | Graham et al. | |
| 8,359,654 B2 | 1/2013 | Rave et al. | |
| 8,615,517 B1 | 12/2013 | Vice et al. | |
| 9,137,281 B2 * | 9/2015 | Warrick | H04L 41/0893 |
| 9,172,733 B2 * | 10/2015 | Warrick | H04L 41/0893 |
| 2005/0008327 A1 | 1/2005 | Shinkai | |
| 2005/0276570 A1 * | 12/2005 | Reed | G06F 17/30038 386/231 |
| 2007/0105577 A1 * | 5/2007 | Bonta | H04L 29/06027 455/517 |
| 2007/0237225 A1 | 10/2007 | Luo | |
| 2007/0282901 A1 * | 12/2007 | Garcea | H04N 21/235 |
| 2008/0089665 A1 * | 4/2008 | Thambiratnam | G06F 17/30781 386/241 |
| 2008/0199150 A1 * | 8/2008 | Candelore | H04N 7/163 386/241 |
| 2008/0222201 A1 * | 9/2008 | Chen | G06F 17/30265 |
| 2009/0029619 A1 * | 1/2009 | Kovalainen | D04H 1/425 442/334 |

(Continued)

FOREIGN PATENT DOCUMENTS

WO    2006041260 A1    4/2006

OTHER PUBLICATIONS

Apple Inc., "Final Cut Pro X: Transcode media files," Feb. 27, 2014 (Feb. 27, 2014), XP055206224, Retrieved from the Internet: URL: https://web.archive.org/web/20140227125908/http://support.apple.com/kb/PH12702? [retrieved on Aug. 4, 2015].

(Continued)

*Primary Examiner* — Hung Le
(74) *Attorney, Agent, or Firm* — Blank Rome LLP (57) ABSTRACT

Disclosed herein are systems, methods, and non-transitory computer-readable storage media for creating and using media asset proxies. The media asset proxies represent a digital media asset and are created by filtering and modifying elements from the digital media asset. The media asset proxies can be queried in the same manner as their corresponding digital media asset.

23 Claims, 8 Drawing Sheets

(56) References Cited

U.S. PATENT DOCUMENTS

| | | | |
|---|---|---|---|
| 2009/0198732 A1* | 8/2009 | Ross | G06F 17/30011 |
| 2009/0298525 A1* | 12/2009 | Shaffer | H04L 65/605 |
| | | | 455/519 |
| 2010/0057694 A1 | 3/2010 | Kunjithapatham | |
| 2011/0026900 A1 | 2/2011 | Lussier et al. | |
| 2011/0261030 A1* | 10/2011 | Bullock | G06F 15/0283 |
| | | | 345/204 |
| 2011/0313972 A1 | 12/2011 | Albouze | |
| 2012/0005708 A1* | 1/2012 | Kelts | G06F 3/0481 |
| | | | 725/44 |
| 2012/0066343 A1* | 3/2012 | Van Vleck | G06F 17/30038 |
| | | | 709/217 |
| 2012/0079537 A1 | 3/2012 | Kalidindi | |
| 2012/0144302 A1 | 6/2012 | Campanotti et al. | |
| 2012/0147265 A1* | 6/2012 | Gu | H04N 5/4403 |
| | | | 348/473 |
| 2012/0173577 A1 | 7/2012 | Millar | |
| 2012/0215329 A1* | 8/2012 | Jiang | G06F 17/30017 |
| | | | 700/94 |
| 2013/0272377 A1* | 10/2013 | Karczewicz | H03M 7/30 |
| | | | 375/240.02 |
| 2013/0318360 A1* | 11/2013 | Yamamoto | G06F 21/602 |
| | | | 713/189 |
| 2013/0346456 A1 | 12/2013 | Sparenberg | |
| 2014/0173437 A1* | 6/2014 | Pugh | G11B 27/034 |
| | | | 715/723 |
| 2014/0177964 A1* | 6/2014 | Godlewski | H04N 21/23109 |
| | | | 382/190 |
| 2014/0185690 A1* | 7/2014 | Wang | H04N 19/00533 |
| | | | 375/240.25 |
| 2014/0223480 A1* | 8/2014 | Berry | H04N 21/4668 |
| | | | 725/40 |
| 2014/0280390 A1* | 9/2014 | Bubash | G06F 17/30123 |
| | | | 707/821 |
| 2014/0359648 A1* | 12/2014 | Yin | H04N 21/44222 |
| | | | 725/14 |
| 2014/0379707 A1* | 12/2014 | Givoni | G06F 17/30014 |
| | | | 707/726 |
| 2015/0134668 A1* | 5/2015 | Popovich | G06F 17/3082 |
| | | | 707/741 |

OTHER PUBLICATIONS

International Search Report dated Aug. 19, 2015 for corresponding International Application No. PCT/US2015/032509, filed May 27, 2015.

* cited by examiner

| Sample table atom | |
|---|---|
| Atom size | |
| Type = 'stbl' | |
| Sample description atom | 'stsd' |
| Time-to-sample atom | 'stts' |
| Composition Offset atom | 'ctts' |
| Composition Shift Least Greatest atom | 'cslg' |
| Sync Sample atom | 'stss' |
| Partial Sync Sample atom | 'stps' |
| Sample-to-chunk atom | 'stsc' |
| Sample Size atom | 'stsz' |
| Chunk Offset atom | 'stco' |
| Shadow Sync atom | 'stsh' |
| Sample Group Description atom | 'sgpd' |
| Sample-to-group atom | 'sbgp' |
| Sample Dependency Flags atom | 'sdtp' |

FIG. 4

ORIGINAL FILE

| FILE OFFSET | ATOM TYPE | ATOM SIZE | ACTION |
|---|---|---|---|
| 0 | 'ftyp' | 12+8 bytes | COPY |
| 20 | 'wide' | 0+8 bytes | OMIT |
| 28 | 'mdat' | 269863580+8 bytes | OMIT |
| 269863616 | 'moov' | 227251+8 bytes | COPY |
| 269863624 |   'mvhd' | 100+8 bytes | COPY |
| 269863732 |   'trak' | 102341+8 bytes | COPY |
| 269863740 |     'tkhd' | 84+8 bytes | COPY |
| 269863832 |     'tapt' | 60+8 bytes | COPY |
| 269863840 |       'clef' | 12+8 bytes | COPY |
| 269863860 |       'prof' | 12+8 bytes | COPY |
| 269863880 |       'enof' | 12+8 bytes | COPY |
| 269863900 |     'edts' | 28+8 bytes | COPY |
| 269863908 |       'elst' | 20+8 bytes | COPY |
| 269863936 |     'mdia' | 102137+8 bytes | COPY |
| 269863944 |       'mdhd' | 24+8 bytes | COPY |
| 269863976 |       'hdlr' | 41+8 bytes | COPY |
| 269864025 |       'minf' | 102048+8 bytes | COPY |
| 269864033 |         'vmhd' | 12+8 bytes | COPY |
| 269864053 |         'hdlr' | 48+8 bytes | COPY |
| 269864109 |         'dinf' | 28+8 bytes | COPY |
| 269864117 |           'dref' | 20+8 bytes | COPY |
| 269864145 |         'stbl' | 101928+8 bytes | COPY |
| 269864153 |           'stsd' | 130+8 bytes | COPY |
| 269864291 |           'stts' | 3576+8 bytes | ENCODE |
| 269867875 |           'stss' | 2428+8 bytes | OMIT |
| 269870311 |           'sdtp' | 18142+8 bytes | TRUNCATE |
| 269888461 |           'stsc' | 200+8 bytes | RECREATE |
| 269888669 |           'stsz' | 72564+8 bytes | ENCODE |
| 269961241 |           'stco' | 4832+8 bytes | RECREATE |
| 269966081 |   'trak' | 123724+8 bytes | COPY |
| 269966089 |     'tkhd' | 84+8 bytes | COPY |
| 269966181 |     'edts' | 40+8 bytes | COPY |
| 269966189 |       'elst' | 32+8 bytes | COPY |
| 269966229 |     'mdia' | 123576+8 bytes | COPY |
| 269966237 |       'mdhd' | 24+8 bytes | COPY |
| 269966269 |       'hdlr' | 41+8 bytes | COPY |
| 269966318 |       'minf' | 123487+8 bytes | COPY |
| 269966326 |         'smhd' | 8+8 bytes | COPY |
| 269966342 |         'hdlr' | 48+8 bytes | COPY |
| 269966398 |         'dinf' | 28+8 bytes | COPY |
| 269966406 |           'dref' | 20+8 bytes | COPY |
| 269966434 |         'stbl' | 123371+8 bytes | COPY |
| 269966442 |           'stsd' | 175+8 bytes | COPY |
| 269966625 |           'stts' | 16+8 bytes | ENCODE |
| 269966649 |           'stsc' | 14180+8 bytes | RECREATE |
| 269980837 |           'stsz' | 104128+8 bytes | ENCODE |
| 270084973 |           'stco' | 4832+8 bytes | RECREATE |
| 270089813 |   'udta' | 30+8 bytes | COPY |
| 270089851 | 'free' | 1016+8 bytes | OMIT |
| 270090875 | | | |

FIG. 5

PROXY FILE

| FILE OFFSET | ATOM TYPE | | | | | ATOM SIZE |
|---|---|---|---|---|---|---|
| 0 | 'ftyp' | | | | | 12+8 bytes |
| 20 | 'moov' | | | | | 1957+8 bytes |
| 28 | | 'mvhd' | | | | 100+8 bytes |
| 136 | | 'trak' | | | | 1167+8 bytes |
| 144 | | | 'tkhd' | | | 84+8 bytes |
| 236 | | | 'tapt' | | | 60+8 bytes |
| 244 | | | | 'clef' | | 12+8 bytes |
| 264 | | | | 'prof' | | 12+8 bytes |
| 284 | | | | 'enof' | | 12+8 bytes |
| 304 | | | 'edts' | | | 28+8 bytes |
| 312 | | | | 'elst' | | 20+8 bytes |
| 340 | | | 'mdia' | | | 963+8 bytes |
| 348 | | | | 'mdhd' | | 24+8 bytes |
| 380 | | | | 'hdlr' | | 41+8 bytes |
| 429 | | | | 'minf' | | 874+8 bytes |
| 437 | | | | | 'vmhd' | 12+8 bytes |
| 457 | | | | | 'hdlr' | 48+8 bytes |
| 513 | | | | | 'dinf' | 28+8 bytes |
| 521 | | | | | | 20+8 bytes |
| 549 | | | | | 'stbl' | 754+8 bytes |
| 557 | | | | | | 130+8 bytes |
| 695 | | | | | | 32+8 bytes |
| 735 | | | | | | 500+8 bytes |
| 1243 | | | | | | 20+8 bytes |
| 1271 | | | | | | 12+8 bytes |
| 1291 | | | | | | 12+8 bytes |
| 1311 | | 'trak' | | | | 628+8 bytes |
| 1319 | | | 'tkhd' | | | 84+8 bytes |
| 1411 | | | 'edts' | | | 40+8 bytes |
| 1419 | | | | 'elst' | | 32+8 bytes |
| 1459 | | | 'mdia' | | | 480+8 bytes |
| 1467 | | | | 'mdhd' | | 24+8 bytes |
| 1499 | | | | 'hdlr' | | 41+8 bytes |
| 1548 | | | | 'minf' | | 391+8 bytes |
| 1556 | | | | | 'smhd' | 8+8 bytes |
| 1572 | | | | | 'hdlr' | 48+8 bytes |
| 1628 | | | | | 'dinf' | 28+8 bytes |
| 1636 | | | | | | 20+8 bytes |
| 1664 | | | | | 'stbl' | 275+8 bytes |
| 1672 | | | | | | 175+8 bytes |
| 1855 | | | | | | 16+8 bytes |
| 1879 | | | | | | 20+8 bytes |
| 1907 | | | | | | 12+8 bytes |
| 1927 | | | | | | 12+8 bytes |
| 1947 | | 'udta' | | | | 30+8 bytes |
| 1985 | | | | | | |

MEDIA ASSET PROXIES

TECHNICAL FIELD

The present technology pertains to digital media asset management, and more specifically pertains to creating media asset proxies that can be used to represent digital media assets.

BACKGROUND

Digital media assets can be created and shared among a variety of electronic devices. For example, mobile phones, desktop computers, tablets, or laptops are all capable of creating, storing, and utilizing digital media assets. A device user can record a movie using a mobile phone and then upload the movie to a network cloud so that it is accessible on the device user's tablet. It is typical for device users to manage digital media assets among multiple electronic devices. Consequently, digital media assets are often backed-up or shared using computer networks such as cloud computing and storage.

However, uploading and downloading content-rich digital media assets can burden network resources due to the large file sizes. Furthermore, storing many large digital media assets on multiple devices can be impractical and inefficient. Consequently, digital media assets can be managed more effectively by creating and using media asset proxies.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Digital media assets can have large file sizes that can burden both network and device resources. The proliferation of electronic devices that are capable of creating content-rich digital media assets necessitates a more effective manner for managing the wide inventory of digital media assets. A media asset proxy can have a significantly smaller file size than its corresponding digital media asset while preserving all relevant properties of the digital media asset. For example, the media asset proxy can be queried for properties such as the title, the file type, the author, copyright, the language, the time duration of a movie, audio sample rate, video sample rate, etc. These properties can all be read by software on the device that is configured to inspect or query a file type that corresponds to the digital media asset. Disclosed are systems, methods, and non-transitory computer-readable storage media for creating and using media asset proxies that can be used to represent digital media assets.

One aspect of the present technology involves a method for creating a media asset proxy. The media asset proxy can be created by parsing the corresponding digital media asset and identifying individual elements for exclusion from the media asset proxy. Furthermore, a portion of the elements that remain for inclusion in the media asset proxy can be reduced in size by intelligently truncating or encoding the data associated with the element. The resulting media asset proxy can be queried in the same manner as its corresponding digital media asset because it maintains all of the relevant properties while having a significantly smaller file size.

Another aspect of the present technology involves a non-transitory computer-readable storage medium that has instructions that cause a processor to create a media asset proxy. The media asset proxy can be created by parsing the corresponding digital media asset and identifying individual elements for exclusion from the media asset proxy. The elements can be excluded according to an omission filter that removes elements when their identified type indicates that they are not required to formulate a response to a query of the media asset proxy. Also, a portion of the elements that included in the media asset proxy can be reduced in size by truncating or encoding the element so that it can masquerade as the original. The resulting media asset proxy can be queried in the same manner as its corresponding digital media asset because it maintains all of the relevant properties while having a significantly smaller file size.

A further aspect of the present technology involves a method for using a media asset proxy. A media asset proxy representing a digital media asset can be downloaded to a client device and queried to determine any of the properties of its corresponding digital media asset. Based on the results of the query, the device or its user can determine if the digital media asset is suitable for the device. Accordingly, the digital media asset can be downloaded to the device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an exemplary file structure of a digital media asset;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for creating media asset proxies that can be used to effectively represent digital media assets. In particular, the present technology is directed to systems, methods, devices, and non-transitory computer-readable storage media providing the creation of media asset proxies for the effective management of digital media assets.

Prior to discussing the present technology in detail, a brief introductory description of an exemplary configuration of devices and a network is disclosed herein. A detailed description of the various aspects of the present technology will then follow. These variations will be described herein as the various embodiments are set forth.

Figure 1:
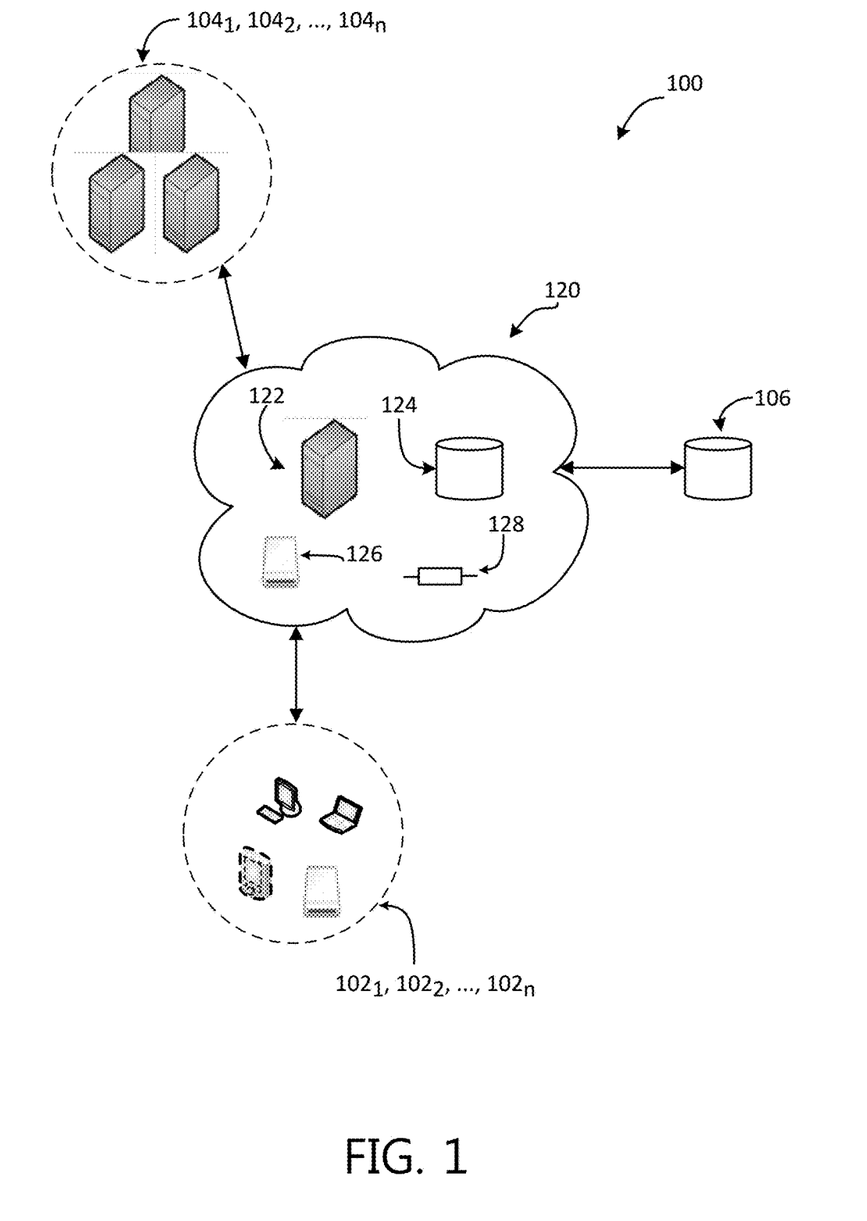
FIG. 1 illustrates an exemplary cloud computing configuration.

Cloud computing is a type of Internet-based computing in which a variety of resources are hosted and/or controlled by an entity and made available by the entity to authorized users via the Internet. An exemplary cloud computing system configuration 100 is illustrated in FIG. 1 wherein a variety of electronic devices can communicate via a network for purposes of exchanging content and other data. The system can be configured for use on a wide variety of network configurations that facilitate the intercommunication of electronic devices. For example, each of the components of system 100 in FIG. 1 can be implemented in a localized or distributed fashion in a network.

System 100 can be configured to include cloud infrastructure 120. The cloud infrastructure 120 can include a variety of hardware and/or software resources, such as cloud servers 122, cloud databases 124, cloud storage 126, cloud networks 128, cloud applications, cloud platforms, and/or any other cloud computing resources. In some cases, the cloud computing resources are distributed. For example, cloud storage 126 can include multiple storage devices. In some cases, cloud computing resources can be distributed across multiple cloud computing systems and/or individual network connected computing devices. For example, cloud infrastructure 120 can communicate with servers $104_1$, $104_2$, . . . , $104_n$ (collectively "104"), database 106, and/or any other network connected computing device to provide the cloud computing resources.

Furthermore, in some cases, the cloud computing resources can be redundant. For example, if cloud infrastructure 120 is configured to provide data backup services, multiple copies of the data can be stored such that if one storage resource is unavailable, the data will still be available to the user via a different storage resource. In another example, if cloud infrastructure 120 is configured to provide software, the software can be available from different cloud servers so that the software can be served from the closest server.

In system 100, a user interacts with the cloud infrastructure 120 through user terminals $102_1$, $102_2$, . . . , $102_n$ (collectively "102") connected to a network by direct and/or indirect communication. Cloud infrastructure 120 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud infrastructure 120 can concurrently accept connections from and interact with multiple electronic devices.

Cloud infrastructure 120 can provide cloud computing resources through a variety of deployment models, such as public, private, community, hybrid, and/or any other cloud deployment model. In some cases, cloud infrastructure 120 can support multiple deployment models. For example, cloud infrastructure 120 can provide one set of resources through a public deployment model and another set of resources through a private deployment model.

In some configurations, a user terminal $102_i$ can access cloud infrastructure 120 from any location where an Internet location is available. However, in other cases, cloud infrastructure 120 can be configured to restrict access to certain resources such that a resource can only be accessed from certain locations. For example, if cloud infrastructure 120 is configured to provide a resource using a private deployment model, then cloud infrastructure 120 can restrict access to the resource, such as by requiring that a user terminal $102_i$ access the resource from behind a firewall.

Cloud infrastructure 120 can provide cloud computing resources to user terminals 102 through a variety of service models, such as Software as a Service (SaaS), Platforms as a service (PaaS), Infrastructure as a Service (IaaS), and/or any other cloud service models. In some cases, cloud infrastructure 120 can provide multiple service models to a user terminal $102_i$. For example, cloud infrastructure 120 can provide both SaaS and IaaS to a user terminal $102_i$. In some cases, cloud infrastructure 120 can provide different service models to different user terminals 102. For example, cloud infrastructure 120 can provide SaaS to user terminal $102_1$ and PaaS to user terminal $102_2$.

In some cases, cloud infrastructure 120 can maintain an account database (not shown). The account database can store profile information for registered users. The profile information can include resource access rights, such as software the user is permitted to user, maximum storage space, etc. The profile information can also include usage information, such as computing resources consumed, data storage location, security settings, personal configuration settings, etc.

Cloud infrastructure 120 can provide a variety of functionality that requires user interaction. Accordingly, a user interface (UI) can be provided for communicating with cloud infrastructure 120 and/or performing tasks associated with the cloud computing resources. The UI can be accessed via an end user terminal $102_i$ in communication with cloud infrastructure 120. The UI can be configured to operate in a variety of client modes, including a fat client mode, a thin client mode, or a hybrid client mode, depending on the storage and processing capabilities of cloud infrastructure 120 and/or the user terminal $102_i$. Therefore, a UI can be implemented as a standalone application operating at the user terminal in some embodiments. In other embodiments, a web browser-based portal can be used to provide the UI. Any other configuration to access cloud infrastructure 120 can also be used in the various embodiments.

As described above, in some configurations, the cloud computing resources can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are generally recognized meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud storage.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud storage.

Now that some basic concepts have been set forth, the present disclosure turns to a more detailed description of the present technology. As discussed above, the present technology is directed to systems and methods to create media asset proxies that can represent digital media assets. The following figures provide exemplary systems and methods for practicing the present technology.

Figure 2:
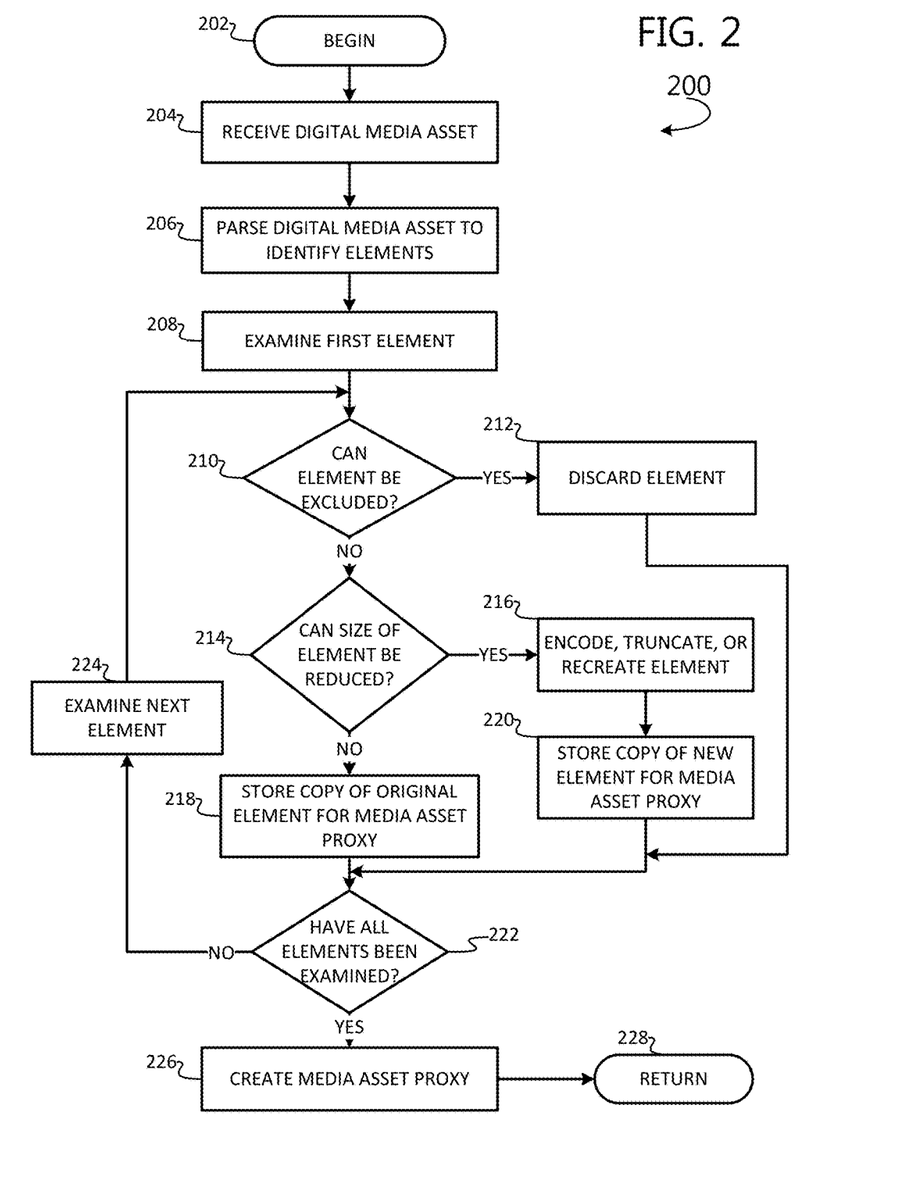
FIG. 2 illustrates an exemplary method embodiment.

Turning now to FIG. 2, an operation of the process for creating a media asset proxy for a digital media asset will be discussed in further detail. FIG. 2 is a flowchart of steps in an exemplary method 200 for creating a media asset proxy. Method 200 begins at step 202 and continues to step 204. At step 204, the client device, an example of which is user terminal 102$_n$, receives a digital media asset.

A digital media asset can include images and multimedia files, such as music or movie files. The client device can receive the digital media asset by downloading it from a cloud infrastructure, such as cloud infrastructure 120 described in system 100. Alternatively, the client device can receive the digital media asset via email, instant messaging, multimedia messaging service (MMS), or any other social media application. The client device can also download the digital media asset from an online store or it can create the digital media asset locally by using hardware and software resources available on the device. For example, the client device can be a cellular phone that includes a camera that is capable of recording movies and storing them on the device.

After the client device receives the digital media asset at 204, method 200 continues to step 206 where it parses the digital media asset to identify elements within the media file. For example, a movie file that conforms to the QUICKTIME file format developed by Apple Inc. of Cupertino, Calif. can include elements referred to as atoms. Similarly, a movie file that conforms to the Moving Picture Experts Group (MPEG) standard maintained by the International Organization for Standardization (ISO) can include elements referred to as boxes. Elements such as atoms and boxes are tagged data structures that make up the movie file.

Figure 3:
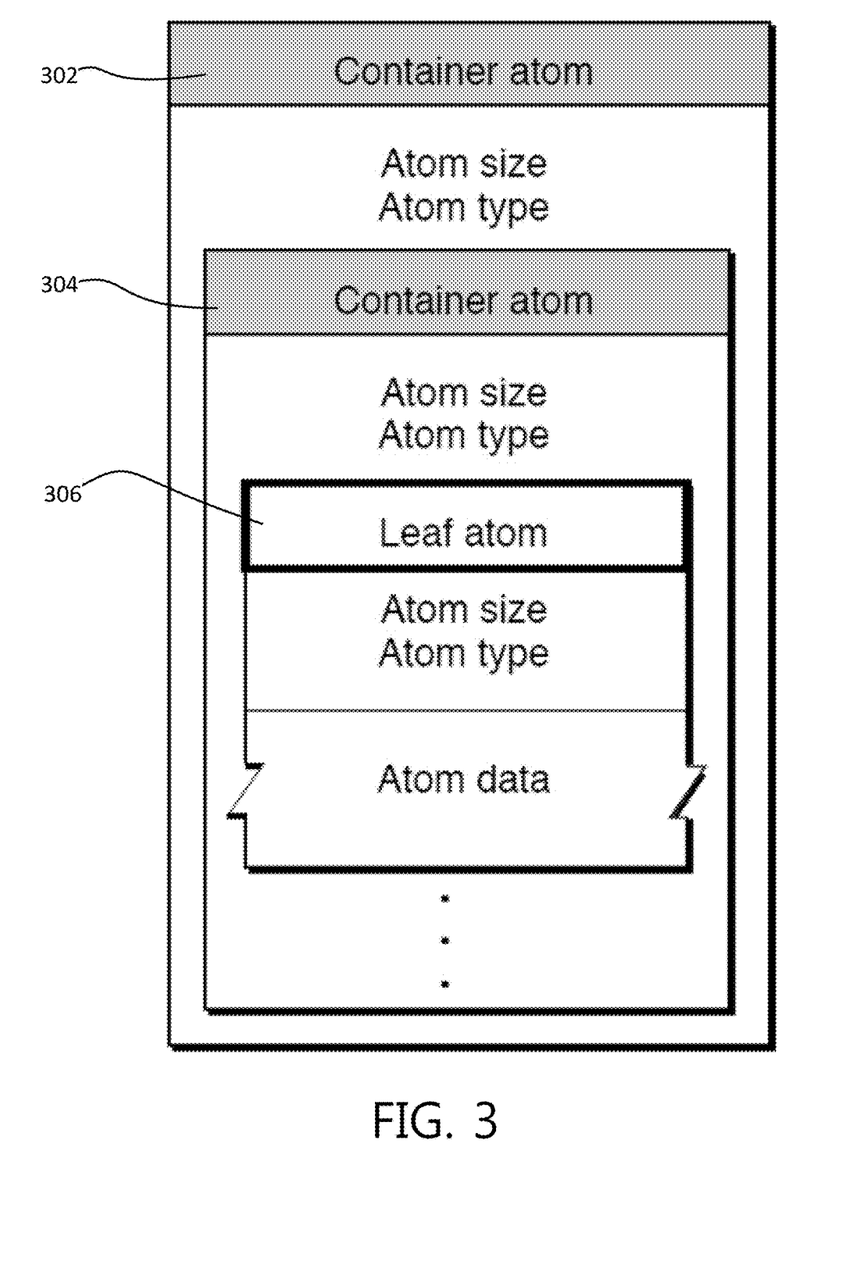
FIG. 3 illustrates an exemplary element from a digital media asset.

The atoms or boxes in the movie file define a hierarchical structure. For example, an atom can contain another atom, which can contain additional atoms, and so on. An atom that contains other atoms is called a container atom. Alternatively, an atom that only contains data and does not contain other atoms is called a leaf atom. FIG. 3 illustrates an exemplary atom structure. Atom 302 is classified as a container atom because it includes atom 304. Similarly, atom 304 is also classified as a container atom because it contains atom 306. Conversely, atom 306 is classified as a leaf atom because it only includes atom data and does not include any additional atoms. Atoms can contain the actual movie sample data as well as metadata that includes information such as the number of tracks, the video compression format, timing information, frame rate, etc.

Parsing the digital media asset to identify elements such as atoms and boxes creates a record of the file structure of the digital media asset. In the case of a hierarchical file structure, a recursive algorithm can be used to effectively parse the elements and efficiently establish the file structure. For example, the parse can be performed in file offset order and can use recursion to parse container atoms as needed. Elements can be present in any order so the entire file needs to be parsed before concluding that a particular element is not present in the digital media asset.

Once the file structure and associated elements are identified, method 200 proceeds to step 208 wherein the first element is examined. An element is examined to determine the particular contents of the element and to determine whether that element and its contents should be included in the media asset proxy. In particular, an element can be excluded from the media asset proxy, included verbatim in the media asset proxy, or modified for inclusion in the media asset proxy.

Accordingly, the examination of the first element encompasses a series of steps. First, method 200 proceeds to step 210 to determine if the element can be excluded from the media asset proxy. In one example, elements can be excluded using a filtering algorithm that omits or includes an element according to its type. In another example, elements can be removed according to predetermined removal criteria.

For instance, when processing a QUICKTIME media asset, an atom omission filter can be used to determine if individual atoms can be excluded. The atom omission filter can exclude any atom that is not needed to formulate a response to a query of the digital media asset, and therefore is not required for proper functionality of the media asset proxy. An example of an atom that is not needed by the media asset proxy is the media data ('mdat') atom. The media data atom contains the actual media samples that correspond to the video. These atoms are not required because the media asset proxy is intended to represent the digital media asset and is not intended to support playback of the digital media asset.

Similarly, atoms that designate free space ('free') or reserved space ('wide') can be excluded by the atom omission filter because they are not needed by the media asset proxy. These atoms do not contain any relevant data that would be needed by the media asset proxy to respond to a query of the digital media asset. Accordingly, the atom omission filter can mark these atoms for exclusion and the atoms are discarded at step 212 of method 200.

In some embodiments, the atom omission filter or the predetermined removal criteria can be customized to omit additional atoms that are not required for a particular application of the media asset proxy. For example, an application that makes use of the media asset proxy for only querying the title and the length of a movie file can exclude elements related to other properties of the digital media asset. Consequently, the media asset proxy can be further reduced in size by customizing the atom omission filter or the predetermined removal criteria.

Alternatively, an element cannot be discarded according to the filtering algorithm or the predetermined removal criteria if it includes data that is needed to respond to an anticipated query of the media asset proxy. In this case, the method proceeds to step 214 to determine if the size of the element can be reduced. There are particular elements of the digital media asset that can be intelligently reduced in size while maintaining characteristics that are substantially equivalent to the original elements. The algorithms employed can advantageously reduce the size of the elements because the media asset proxy does not have to support playback of the digital media asset. In particular, elements that are candidates for size reduction are processed at step 216 using algorithms that encode, truncate, or recreate the element.

Encoding involves compressing data so that it occupies less memory than the original data representation. In particular, run-length encoding (RLE) is a form of data compression wherein sequences of data elements with the same data value are stored as a single data value and a corresponding count. RLE can be used to compress elements of digital media assets that include data patterns with these characteristics.

Figure 4:
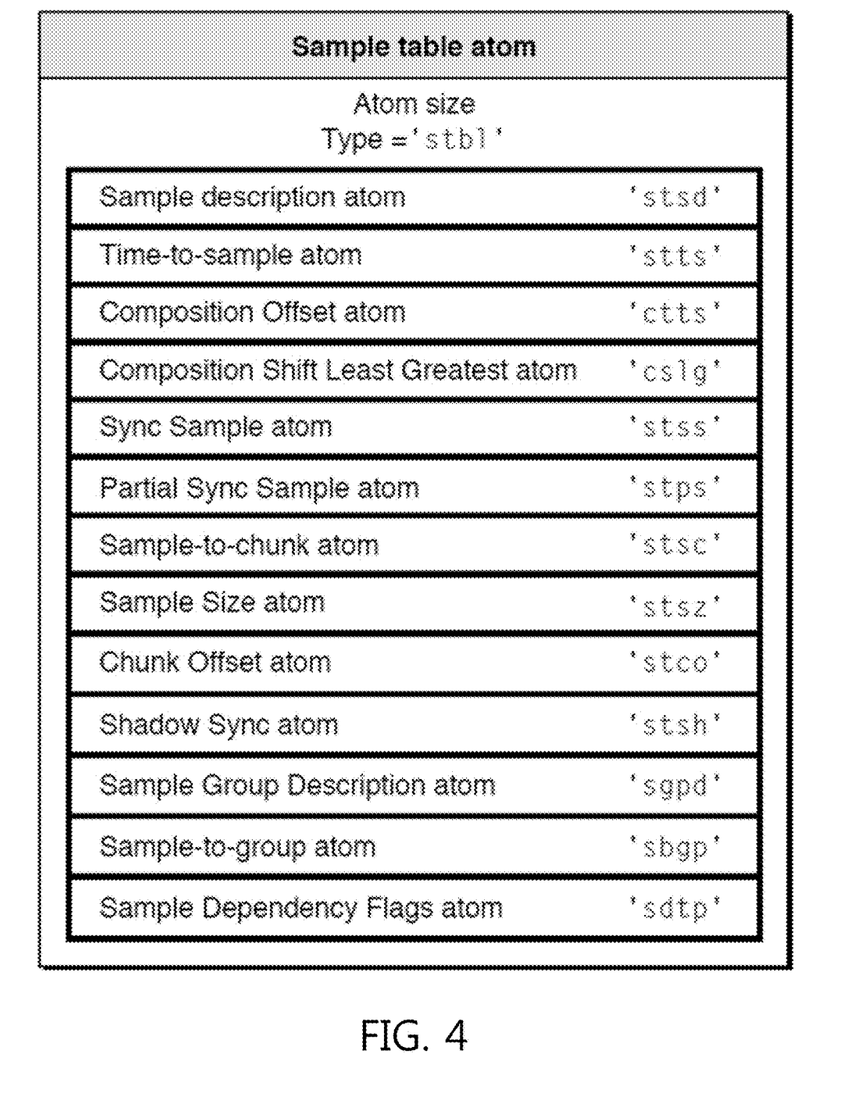
FIG. 4 illustrates an exemplary atom structure from a video asset.

For example, the sample table atom ('stbl') is a container atom in a QUICKTIME media asset that contains various atoms that are candidates for size reduction. The sample table atom contains all the time and data indexing of the media samples in a particular track ('trak'). FIG. 4 illustrates an exemplary sample table atom structure with all of the leaf atoms that it can include. The sample table atom structure in FIG. 4 is also used in media assets such as MPEG-4 and Motion JPEG-2000.

The sample table atom can include atoms that are candidates for the encoding algorithm to reduce the atom size. For example, the composition offset atom ('ctts'), the time-to-sample atom ('stts'), and the sample size atom ('stsz') can all be encoded to reduce their size.

The composition offset atom contains a sample-by-sample mapping of the decode-to-presentation time. Each entry in the composition table is a time delta from decode to presentation time. The composition offset table includes an entry for each distinct offset value. The entry includes the number of samples that have the offset and the offset value. Here is an example of an offset table:

| SampleCount | Offset |
| --- | --- |
| 4 | 5 |
| 3 | 6 |
| 8 | 2 |
| 6 | 1 |

This offset table indicates that there are 4 samples with an offset of 5, there are 3 samples with an offset of 6, there are 8 samples with an offset of 2, and there are 6 samples with an offset of 1. The offset table can be encoded with a table that contains up to three entries. The entries on the encoded table correspond to: [number of samples with minimum value, minimum offset value], [number of samples with maximum value, maximum offset value], and [number of remaining samples, average offset value of remaining samples]. In the table above, the minimum offset value is 1, the maximum offset value is 6, and there are 12 other samples with an average offset value of 3. Accordingly the table above can be replaced with following table:

| SampleCount | Offset |
| --- | --- |
| 6 | 1 |
| 3 | 6 |
| 12 | 3 |

This method of simplifying the composition offset table can greatly reduce the complexity of the composition offset atom. When the minimum and maximum values are equal, the simplified table can contain a single entry. When there are two distinct values, the simplified table can contain two entries. However, any table with more than two offset values can be reduced to a table with three entries in the manner described above.

The next atom that can be encoded is the time-to-sample atom. The time-to-sample atom stores duration information for a digital media asset's samples, providing a mapping from a time in a media to the corresponding data sample. The time-to-sample atom contains a time-to-sample table that is similar to the composition offset table. The time-to-sample table contains entries that indicate a number of samples and the corresponding sample duration for those samples. Accordingly, the time-to-sample table can be encoded in a similar fashion as the composition offset table. The modified time-to-sample table can include up to three entries: [number of samples with minimum value, minimum sample duration], [number of samples with maximum value, maximum sample duration], and [number of remaining samples, average sample duration of remaining samples]. This encoding algorithm can greatly reduce the size of the time-to-sample atom.

Another atom that can be encoded is the sample size atom. The sample size atom specifies the size of each sample in the media asset. It contains the sample count and a table giving the size of each sample. This table can be reduced in size by summing all of the sample sizes and dividing by the total number of samples to yield a common sample size.

As noted above, in addition to using an encoding algorithm to reduce atom size, recreation can also be utilized to reduce atom size for certain atoms. Recreation involves generating an atom for the proxy file that masquerades as the original atom, but has a smaller size. An atom is a candidate for recreation if it cannot be discarded altogether but its function can be mimicked or simulated by a simpler data set.

For example, the sample-to-chunk atom ('stsc') contains a table that maps individual samples to "chunks" that contain one or more samples. The chunks are interleaved in the media asset file for optimized data access. However, the media asset proxy is not required to support playback function, so the actual chunk organization is not required but the table must be present and accurate concerning the number of samples in the track. Accordingly, the sample-to-chunk table can be replaced with a single entry that makes all media samples appear to be in one chunk. This technique builds a table with the minimum number of entries required by a software application programming interface (API) that might query the media asset proxy.

Similarly, the chunk offset atom ('stco') included in the sample table atom can be simplified using a similar technique. The chunk offset atom identifies the location of each chunk of data in the media asset's data stream. However, as discussed above, the media asset proxy simulates having all media samples in a single chunk. Therefore, the media asset proxy's chunk offset atom can be simplified to contain a single offset that corresponds to the single chunk. In some instances, the sample table atom contains a 64-bit chunk offset atom ('co64') that contains 64 bit offsets instead of 32 bit offsets. The 64-bit chunk offset atom can be simplified using the same technique as the corresponding 32 bit chunk offset atom.

As further noted above, in addition to using encoding and recreation to reduce atom size, truncation can also be utilized to reduce atom size for certain atoms. Truncation involves generating an atom for the proxy file which excludes portions of the original atom that are non-essential for performing queries or by only including an essential subset of the atoms, resulting in a smaller size.

For example, the sample dependency flags atom ('sdtp') includes a table that describes the dependency of each sample in a track. An inspection or query of a movie by a software API can require surveying the dependency flags for many samples. Accordingly, a fixed number of the dependency flags can be copied to the media asset proxy to satisfy this query operation. The resulting table in the media asset proxy can be a fixed size regardless of the length of the digital media asset. In one embodiment, the first 500 bytes of the sample dependency flags atom is included in the media asset proxy and the remaining portion of the atom is truncated.

Returning to method 200, after the element is processed at step 216, a copy of the newly revised element is stored for use in the media asset proxy at step 220. Alternatively, if the element is not a candidate for size reduction, the process bypasses step 216 and continues to step 218 wherein a copy of the original element is stored for use in the media asset proxy. Hence, elements that cannot be excluded and cannot be reduced in size are copied verbatim from the digital media asset to the media asset proxy. One that is skilled in the art will appreciate that in some embodiments, a combination of encoding, truncating, or recreating can be used to reduce the size of an element.

Returning to the QUICKTIME example, the file type atom ('ftyp') and the movie atom ('moov') are typically located at the top of the file structure hierarchy. The file type atom defines the compatible file specification of the movie. This atom can be used to differentiate between QUICKTIME, MPEG-4, and JPEG-2000 files. Accordingly, the file type atom cannot be excluded or reduced in size. Moreover, the movie type atom encompasses a number of leaf atoms that contain metadata about the movie. While a number of these leaf atoms have been identified for exclusion or size reduction, the movie type atom cannot be excluded or reduced in size. Accordingly, both the file type atom and the movie atom are copied to the media asset proxy.

After the copy of the original element is stored at step 218, the process continues to step 222 where it determines if all of the elements within the digital media asset have been examined. This determination is made according to the information that was obtained by parsing the digital media asset to identify all of the elements at step 206. Accordingly, if there are additional elements that can be examined, the process proceeds to step 224 where it examines the next element. The process will further continue to determine if the next element can be excluded at 210 or reduced in size at 214. However, if all of the elements have been examined, the method continues to create the media asset proxy at 226.

The media asset proxy can be created using a file structure that is similar to the digital media asset. For example, the media asset proxy can have a similar hierarchy of elements as its corresponding digital media asset. The media asset proxy can be created using elements that were copied in their original form or modified using an algorithm to reduce their size. Certain elements from the digital media asset can be excluded altogether from the media asset proxy without affecting its ability to be queried or inspected by software that is designed to interface with the digital media asset.

In some embodiments, the media asset proxy can be created concurrently with the parsing of the digital media asset. For example, the parsing can identify a first element in the digital media asset and the parsed element can be omitted from the media asset proxy or it can be copied or reduced/encoded into a corresponding output element that is part of the media asset proxy. Accordingly, the media asset proxy can be created as the media asset proxy is parsed.

The media asset proxy can have a file size that is substantially less than its corresponding digital media asset. For example, a 60 minute movie file can be reduced from approximately 1.6 GB to approximately 1.9 KB. Similarly, a 10 minute movie file can also be reduced from approximately 270 MB to approximately 1.9 KB. Accordingly, the file size of the media asset proxy can be independent of its digital media asset. The media asset proxy created from the 10 minute movie file has a file size that is substantially equivalent to the media asset proxy created from the 60 minute movie file. Hence, it is easier to manage media asset proxy files than their corresponding digital media assets because the proxy files can be queried at a consistent rate. Conversely, querying a large digital media asset can take substantially longer than a small digital media asset because of the added time to parse the larger file.

After the media asset proxy is created at 226, process 200 concludes at step 228 were it returns to previous processing, which can include repeating process 200.

Turning now to FIG. 5, an exemplary file structure of a digital media asset will be discussed in further detail. FIG. 5 corresponds to a QUICKTIME movie file having a duration of 10 minutes. The "Atom Type" field designates the particular atom (element) that can be identified during the parsing of the file. Furthermore, the hierarchical structure of the file is illustrated by the indentation of each atom type. For example, the 'moov' atom contains the 'mvhd' atom and two 'trak' atoms. Likewise, the first (top) 'trak' atom contains a 'tkhd' atom, a 'tapt' atom, a 'edts' atom, and a 'mdia' atom, and so forth.

The "Action" column identifies how each individual atom will be handled in creating the media asset proxy. An atom designated with the "copy" action will be copied verbatim from the digital media asset to the media asset proxy. An atom designated with the "omit" action will be filtered out and discarded when created the media asset proxy. Atoms that are designated with "encode," "truncate," or "recreate" will be processed according to a predetermined algorithm that will reduce the overall size of the atom. The "File Offset" column displays the offset where each atom type is located within the file structure. The "Atom Size" column displays the total size of each atom, which includes the contribution of the atoms that reside inside container atoms. The bottom of the file offset column reflects the total file size for this movie which is approximately 270 MB.

Figure 6:
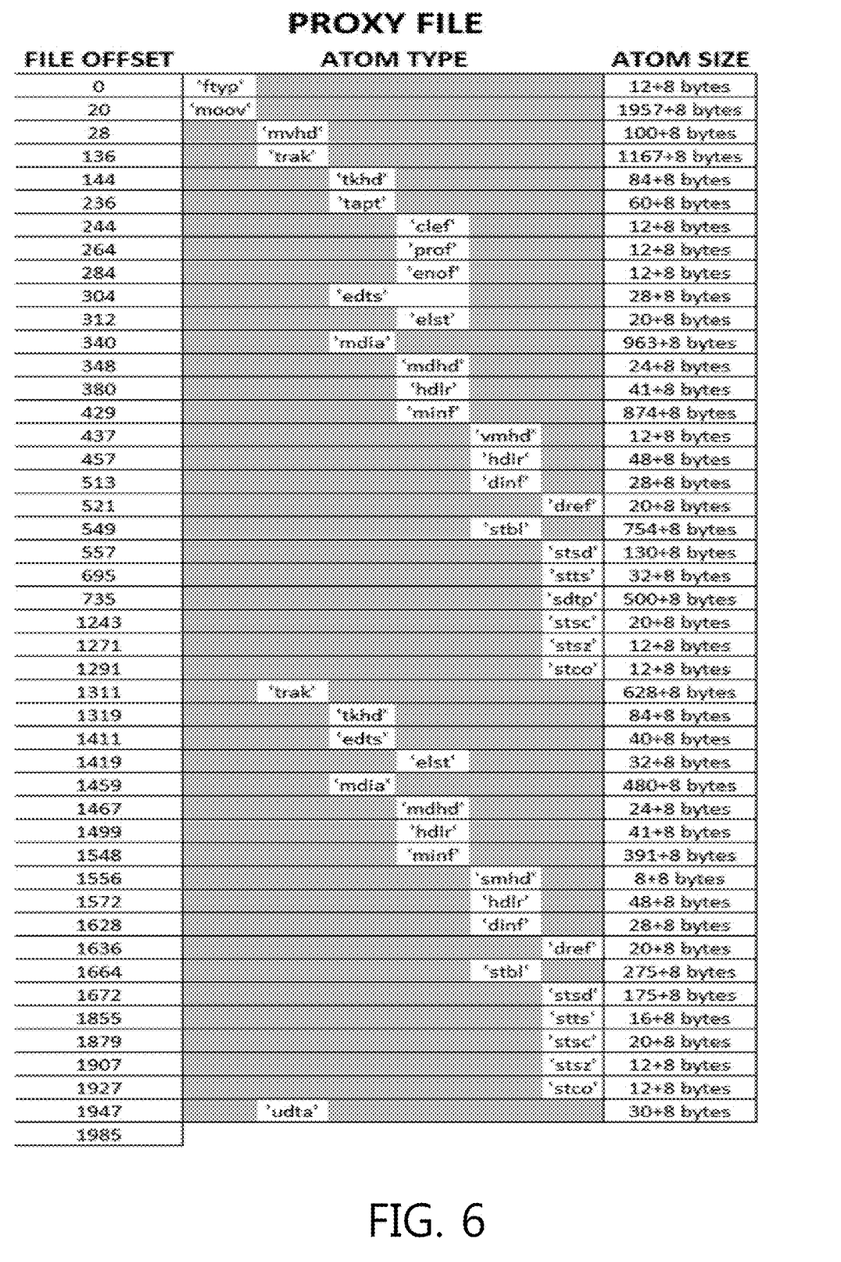
FIG. 6 illustrates an exemplary file structure of a media asset proxy.

FIG. 6 illustrates an exemplary file structure of the media asset proxy that corresponds to the digital media asset illustrated by FIG. 5. The media asset proxy in FIG. 6 results from copying, omitting, and modifying each of the atoms according to the previously discussed actions. Accordingly, the media asset proxy in FIG. 6 has a total file size of approximately 1.9 KB, reduced from the original 270 MB.

Figure 7:
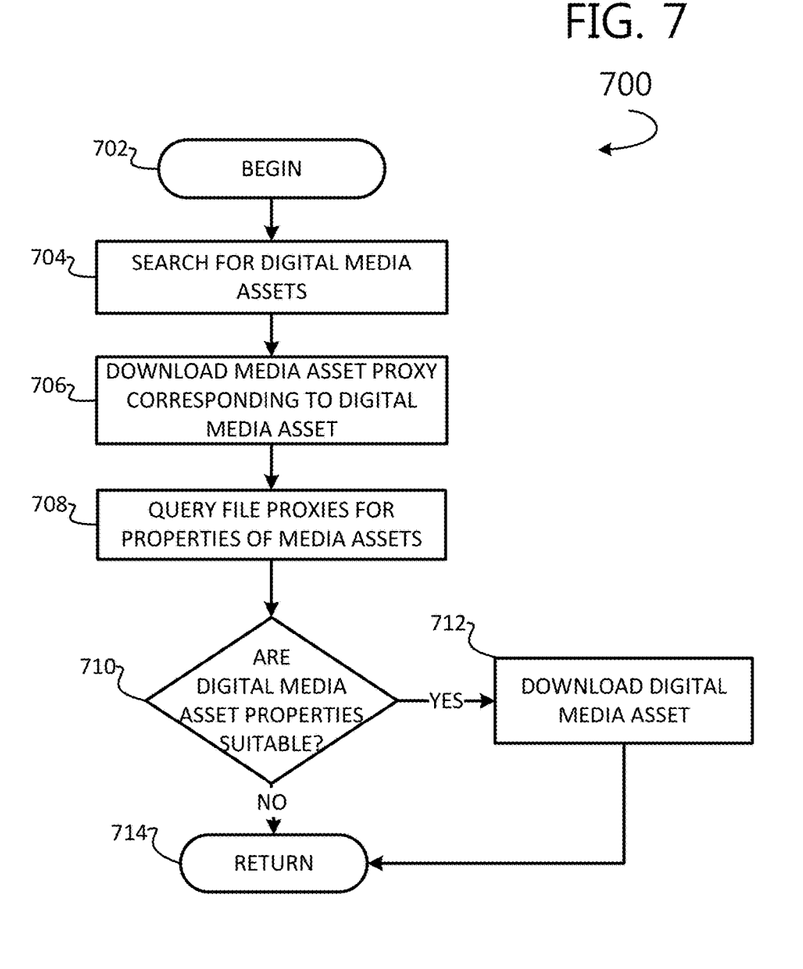
FIG. 7 illustrates an exemplary method embodiment.

Turning now to FIG. 7, an exemplary method for using a media asset proxy will be discussed in further detail. Method 700 begins at step 702 and continues to step 704. At 704, a search for digital media assets is performed. For example, the search can be performed by a client device that communicates with network resources such as those described in cloud computing system 100. The device user can search the cloud for a digital media asset such as a movie that was previously uploaded to the cloud from a different client device.

At step 706, the client device downloads the media asset proxy that representing or corresponds to the digital media asset. This download can be performed quickly and efficiently because of the media asset proxy's significantly smaller file size. Furthermore, the client device need not have significant available space in the device memory to store the media asset proxy.

After the media asset proxy is downloaded at step 706, the method proceeds to step 708 wherein the media asset proxy is queried to determine the properties of the media asset. These properties can include, for example, the title, the file type, the author, copyright, the language, GPS information, the time duration of a movie, the number of audio channels, audio sample rate, video sample rate, video frame height/width, etc. These properties can all be read by software on the device that is configured to inspect or query a file type that corresponds to the digital media asset. Furthermore, querying the media asset proxy on the client device alleviates the processing burden on the cloud infrastructure 120 and the amount of network traffic between the cloud and the client device. In addition, cloud infrastructures can be designed solely for mass storage of digital media assets.

After the media asset proxy is queried, the method proceeds to step 710 to determine if the digital media asset's properties, ascertained from the media asset proxy, are suitable for viewing on the client device. For example, the properties can indicate that the digital media asset's resolution cannot be properly rendered on the client device's display. Further, the properties can indicate that the client device does not have an application that is suitable for playing the digital media asset. In each of these cases, the client device will have avoided the time and expense associated with downloading a digital media asset that was not properly compatible with the client device. In some cases, a notification can be provided at the client device indicating that the digital media asset cannot be downloaded and, optionally, why. The method will proceed to step 714 where it returns to previous processing, including repeating method 700.

Alternatively, it can be determined that the properties associated with the digital media asset are compatible with the client device. In this case, the method can proceed to step 712 wherein the digital media asset is downloaded for use on the client device, such as playback. In some embodiments, the client device can download the digital media asset automatically upon determining, via the media asset proxy, that the properties are compatible. Alternatively, the client device can prompt the device user for input as to whether it should proceed to download the digital media asset. The prompt to the device user can contain additional information such as the amount of memory necessary and/or available for downloading the digital media asset and also an estimated amount of time that it will take to download the digital media asset.

After the digital media asset is downloaded, method 700 proceeds to step 714 where it returns to previous processing, including repeating method 700.

Although the foregoing discussion focuses on creating and using asset proxy files for digital media assets, the present technology can be applied to any other type of file having a file format that can be similarly parsed for the purpose of extracting and reducing pertinent file data. For example, a ZIP archive contains a central directory with particular elements that can be parsed and processed to create a ZIP archive proxy. The ZIP archive proxy could then be queried similarly to the corresponding ZIP archive for properties such as files present, creation date, compression rate, etc. However, the present technology is not limited to archive files and can be used with any other type of file.

Figure 8A:
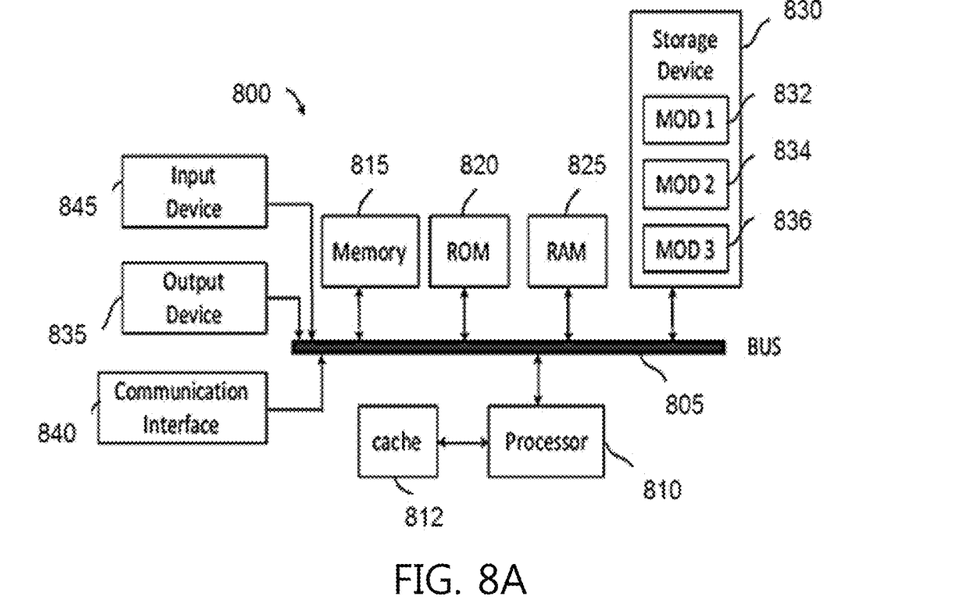
FIG. 8A and FIG. 8B illustrate exemplary system embodiments.
Figure 8B:
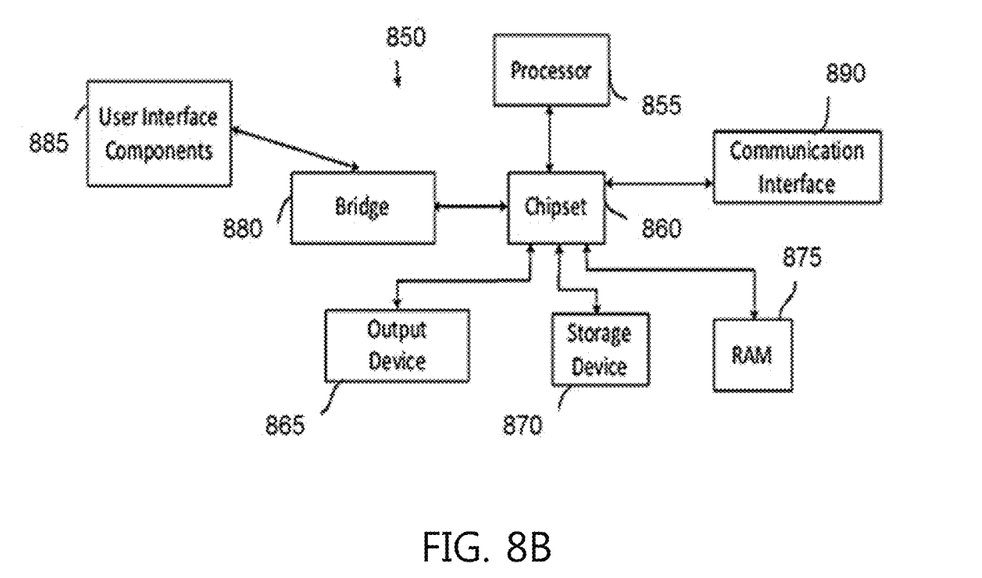

FIG. 8A, and FIG. 8B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that exemplary systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

As used herein, the terms "substantially," "approximately," or "the like" shall mean being within 20% of the stated value, measurement, dimension or property. The word "exemplary" is used herein to mean "serving as an example or illustration." Any aspect or design described herein as "exemplary" is not necessarily to be construed as preferred or advantageous over other aspects or designs.

We claim:

1. A computer-implemented method, comprising:
   parsing a digital media asset having media data to identify a plurality of elements;
   removing a portion of the plurality of elements according to a removal criteria to yield a reduced plurality of elements, wherein the removal criteria specifies removal of any identified element that includes either media data or metadata that is unneeded for responding to a set of queries supported by the digital media asset;
   modifying one or more elements of the reduced plurality of elements according to a predetermined algorithm; and
   creating a media asset proxy to represent the digital media asset, the media asset proxy excluding the elements identified by the removal criteria and supporting the set of queries supported by the digital media asset, wherein the media asset proxy is created using the reduced plurality of elements that includes the one or more elements modified according to the predetermined algorithm.

2. The computer-implemented method of claim 1, wherein the removal criteria comprises a list of element types that are to be excluded from the media asset proxy.

3. The computer-implemented method of claim 1, wherein the predetermined algorithm comprises:
truncating at least one element from the reduced plurality of elements, the at least one element having no effect on the media asset proxy supporting the set of queries.

4. The computer-implemented method of claim 1, wherein the predetermined algorithm comprises:
encoding at least one element from the reduced plurality of elements into a smaller size, the at least one element having no effect on the media asset proxy supporting the set of queries.

5. The computer-implemented method of claim 1, further comprising:
creating a second media asset proxy to represent a second digital media asset, the media asset proxy and the second media asset proxy having substantially equivalent file sizes.

6. The computer-implemented method of claim 1, wherein the digital media asset is a digital movie file.

7. A computer-implemented method, comprising:
parsing a digital media asset having media data to identify a plurality of elements;
removing a portion of the plurality of elements according to a removal criteria to yield a reduced plurality of elements;
modifying one or more elements of the reduced plurality of elements based, at least in part, on encoding at least one element from the reduced plurality of elements, wherein the at least one element comprises a data structure indicative of time and data indexing pairs for the digital media asset, and wherein the encoding comprises creating a new data structure summarizing the data structure that is indicative of time and data indexing pairs for the digital media asset; and
creating a media asset proxy to represent the digital media asset, the media asset proxy excluding the media data and supporting a set of queries supported by the digital media asset, wherein the media asset proxy is created using the reduced plurality of elements that includes the one or more elements modified according to the predetermined algorithm.

8. A non-transitory computer-readable storage medium having stored thereon instructions which, when executed by a processor, cause the processor to perform operations comprising:
parsing a digital media asset having media data to identify a plurality of elements;
removing a portion of the plurality of elements according to an omission filter to yield a reduced plurality of elements, wherein the omission filter specifies removal of any identified element that includes either media data or metadata that is unneeded for responding to a set of queries supported by the digital media asset;
modifying one or more elements of the reduced plurality of elements according to a predetermined algorithm; and
creating a media asset proxy to represent the digital media asset, the media asset proxy excluding the elements identified by the removal criteria and supporting the set of queries supported by the digital media asset, wherein the media asset proxy is created using the reduced plurality of elements that includes the one or more elements modified according to the predetermined algorithm.

9. The computer-readable storage medium of claim 8, wherein the parsing further identifies a hierarchy among the plurality of elements, wherein at least one element from the plurality of elements is a container for at least another element from the plurality of elements.

10. The computer-readable storage medium of claim 8, wherein the omission filter removes one or more element types that are not required to support the set of queries.

11. The computer-readable storage medium of claim 8, wherein the predetermined algorithm comprises:
truncating at least one element from the reduced plurality of elements, the at least one element having no effect on the media asset proxy supporting the set of queries.

12. The computer-readable storage medium of claim 8, wherein the predetermined algorithm comprises:
encoding at least one element from the reduced plurality of elements into a smaller size, the at least one element having no effect on the media asset proxy supporting the set of queries.

13. The computer-readable storage medium of claim 8, the operations further comprising:
creating a second media asset proxy to represent a second digital media asset, the media asset proxy and the second media asset proxy having substantially equivalent file sizes.

14. A non-transitory computer-readable storage medium having stored thereon instructions which, when executed by a processor, cause the processor to perform operations comprising:
parsing a digital media asset having media data to identify a plurality of elements;
removing a portion of the plurality of elements according to an omission filter to yield a reduced plurality of elements;
modifying one or more elements of the reduced plurality of elements based, at least in part, on truncating at least one element from the reduced plurality of elements, wherein the at least one element comprises a data structure indicative of time and data indexing pairs for the digital media asset, and wherein the truncating comprises creating a new data structure summarizing the data structure that is indicative of time and data indexing pairs for the digital media asset; and
creating a media asset proxy to represent the digital media asset, the media asset proxy excluding the media data and supporting a set of queries supported by the digital media asset, wherein the media asset proxy is created using the reduced plurality of elements that includes the one or more elements modified according to the predetermined algorithm.

15. A client device comprising:
a processor; and
a computer readable medium, having stored thereon a plurality of instructions for causing the processor to perform operations comprising:
parsing a digital media asset having media data to identify a plurality of elements;
removing a portion of the plurality of elements according to a removal criteria to yield a reduced plurality of elements, wherein the removal criteria specifies removal of any identified element that includes either media data or metadata that is unneeded for responding to a set of queries supported by the digital media asset;

modifying one or more elements of the reduced plurality of elements according to a predetermined algorithm; and creating a media asset proxy to represent the digital media asset, the media asset proxy excluding the elements identified by the removal criteria and supporting the set of queries supported by the digital media asset, wherein the media asset proxy is created using the reduced plurality of elements that includes the one or more elements modified according to the predetermined algorithm.

16. The client device of claim 15, wherein the removal criteria comprises a list of element types that are excluded from the media asset proxy.

17. The client device of claim 15, wherein the predetermined algorithm comprises:
truncating at least one element from the reduced plurality of elements, the at least one element having no effect on the media asset proxy supporting the set of queries.

18. The client device of claim 15, wherein the predetermined algorithm comprises:
encoding at least one element from the reduced plurality of elements into a smaller size, the at least one element having no effect on the media asset proxy supporting the set of queries.

19. The client device of claim 15, further comprising:
creating a second media asset proxy to represent a second digital media asset, the media asset proxy and the second media asset proxy having substantially equivalent file sizes.

20. A client device comprising:
a processor; and
a computer readable medium, having stored thereon a plurality of instructions for causing the processor to perform operations comprising:
parsing a digital media asset having media data to identify a plurality of elements;
removing a portion of the plurality of elements according to a removal criteria to yield a reduced plurality of elements;
modifying one or more elements of the reduced plurality of elements based, at least in part, on encoding at least one element from the reduced plurality of elements, wherein the at least one element comprises a data structure indicative of time and data indexing pairs for the digital media asset, and wherein the encoding comprises creating a new data structure summarizing the data structure that is indicative of time and data indexing pairs for the digital media asset; and creating a media asset proxy to represent the digital media asset, the media asset proxy excluding the media data and supporting a set of queries supported by the digital media asset, wherein the media asset proxy is created using the reduced plurality of elements that includes the one or more elements modified according to the predetermined algorithm.

21. A computer-implemented method comprising:
downloading a media asset proxy representing a digital media asset having media data to a client device, the media asset proxy being generated by a process that includes:
parsing the digital media asset having the media data to identify a plurality of elements;
removing a portion of the plurality of elements according to a removal criteria to yield a reduced plurality of elements, wherein the removal criteria specifies removal of any identified element that includes media data such that each element of the reduced plurality of elements excludes either media data or metadata that is unneeded for responding to a set of queries supported by the digital media asset;
modifying one or more elements of the reduced plurality of elements according to a predetermined algorithm; and
creating a media asset proxy to represent the digital media asset, the media asset proxy excluding the elements identified by the removal criteria and supporting the set of queries supported by the digital media asset, wherein the media asset proxy is created using the reduced plurality of elements that includes the one or more elements modified according to the predetermined algorithm;
querying the media asset proxy to determine a plurality of properties associated with the digital media asset;
determining, based on the plurality of properties associated with the digital media asset, that the digital media asset is suitable for the client device; and
downloading the digital media asset to the client device.

22. The computer-implemented method of claim 21, wherein the plurality of properties comprises one or more of a title, a time duration, a file format, a video frame rate, and a number of tracks.

23. The computer-implemented method of claim 21, wherein the querying is performed by an application programming interface configured to inspect the digital media asset.

* * * * *